US007342223B2

(12) United States Patent
Ohkubo et al.

(10) Patent No.: US 7,342,223 B2
(45) Date of Patent: Mar. 11, 2008

(54) MASS SPECTROMETER FOR BIOLOGICAL SAMPLES

(75) Inventors: Kunihiko Ohkubo, Shiga-ken (JP); Kiichi Fukui, Osaka-fu (JP); Kazuyoshi Itoh, Hyogo-ken (JP)

(73) Assignee: Shimadzu Corporation, Kyoto (JP)

( * ) Notice: Subject to any disclaimer, the term of this patent is extended or adjusted under 35 U.S.C. 154(b) by 339 days.

(21) Appl. No.: 11/151,466

(22) Filed: Jun. 14, 2005

(65) Prior Publication Data

US 2005/0279928 A1 Dec. 22, 2005

(30) Foreign Application Priority Data

Jun. 16, 2004 (JP) ............................ 2004-178686

(51) Int. Cl.
*B01D 59/44* (2006.01)

(52) U.S. Cl. .................. 250/288; 250/284; 250/423 P; 250/281; 250/282; 356/318; 356/417

(58) Field of Classification Search .................... None
See application file for complete search history.

(56) References Cited

U.S. PATENT DOCUMENTS 5,594,243 A * 1/1997 Weinberger et al. ........ 250/288
6,864,975 B2 * 3/2005 Itoh et al. .................. 356/317
6,995,841 B2 * 2/2006 Scott et al. ................ 356/318
7,105,811 B2 * 9/2006 Dantus et al. .............. 250/288
2003/0117618 A1 6/2003 Itoh et al.

FOREIGN PATENT DOCUMENTS

CN 1206493 A 1/1999
CN 1424574 A 6/2003

(Continued)

OTHER PUBLICATIONS

A. Assion et al. "Control of Chemical Reactions by Feedback-Optimized Phase-Shaped Femtosecond Laser Pulses" Science, vol. 282, Oct. 1998, pp. 919-922, XP-002397610.

(Continued)

*Primary Examiner*—Jack I. Berman
*Assistant Examiner*—Zia R. Hashmi
(74) *Attorney, Agent, or Firm*—Westerman, Hattori, Daniels & Adrian, LLP.

(57) ABSTRACT

The mass spectrometer according to the present invention includes a light source for emitting pulse light including a plurality of wavelengths; an ionizer for ionizing molecules of a sample by irradiating the light from the light source to the sample; and a mass analyzer for separating ions ionized in the ionizer according to their mass to charge ratios. For the light source, one including a plurality of ultrashort pulse laser sources each emitting a wavelength different from others, and one emitting ultrashort pulse light including plural wavelengths ranging from the visible region to the infrared region generated by dispersing an ultrashort pulse light with continuous (white) spectrum can be used. Pulse lights having plural wavelengths ranging from near infrared to the ultraviolet region respectively share the role; i.e., one of them vaporizes the sample without fragmenting it, and another ionizes the vaporized sample with the single-photon process or two-photon (or multi-photon) process. This enables ionization of protein complexes as a whole contained in the sample, and enables mass analyses of them.

7 Claims, 1 Drawing Sheet

FOREIGN PATENT DOCUMENTS

| | | | |
|---|---|---|---|
| JP | 10-74479 | A | 3/1998 |
| JP | 2003-172702 | | 6/2003 |
| JP | 2003-294627 | | 10/2003 |
| JP | 2004-37128 | | 2/2004 |
| WO | WO 98/09316 | A1 | 3/1998 |
| WO | WO 02/061799 | A2 | 8/2002 |

OTHER PUBLICATIONS

Christopher M. Gittins et al., "Real-Time Quantitative Analysis of Combustion-Generated Polycyclic Aromatic Hydrocarbons by Resonance-Enhanced Multiphoton Ionization Time-of Flight Mass Spectrometry", Analytical Chemistry, vol. 69, No. 3, Feb. 1, 1997, pp. 286-293. XP-002397646.

Nair L. G. et al., "Double Wavelength Operation of a Grazing Incidence Tunable Dye Laser", IEEE Journal of Quantum Electronics, vol., QE-16, No. 2, Feb. 1980, pp. 111-112, XP-000705014.

C-L Wang et al., "Tunable Dual-Wavelength Operation of a Diode Array with an External Grating-Loaded Cavity", Applied Physics Letters. AIP, American Institute of Physics, vol. 64, No. 23, Jun. 6, 1994, pp. 3089-3091, XP000449586.

European Search Report dated Sep. 6, 2006 issued in corresponding European Application No. EP 05 01 2676.

Chinese Office Action dated Nov. 10, 2006, issued in corresponding Chinese Application No. 200510076487.2.

* cited by examiner

MASS SPECTROMETER FOR BIOLOGICAL SAMPLES

The present invention relates to a mass spectrometer using the MALDI (Matrix Assisted Laser Desorption/Ionization) method, which is particularly suited for analyzing proteins, peptides, protein complexes and other biological samples.

BACKGROUND OF THE INVENTION

Among post-genome studies, proteomics studies with comprehensive analyses of genome-produced proteins are intensively conducted, where the proteomics studies include researches of the developments, functions and structures of the proteins. Proteins exhibit their functions through interactions with other molecules (such as other proteins or nucleic acids) with noncovalent bonds (such as hydrogen bonds, ionic bonds and hydrophobic interactions) in almost all vital activities including cell proliferation, differentiation and apoptosis. Thus, in order to reveal the functions of every protein, it is important to know with which molecules the protein reacts.

Owing to the conspicuous progress in mass spectrometers in recent years, mass analysis has become an indispensable method of identifying and analyzing the structures of bio-molecules such as proteins and nucleic acids. In the mass analyses of such bio-molecules, MALDI-TOFMS (Matrix Assisted Laser Desorption/Ionization-Time Of Flight Mass Spectrometry) and FAB-MS (Fast Atom Bombardment-Mass Spectrometry) are quite effective. In the MALDI method, a sample to be analyzed is mixed with a material called matrix which possesses photon absorbing capability, and a series of pulse lasers are irradiated onto the sample-matrix mixture. The matrix quickly absorbs the laser energy, is heated instantaneously, and is vaporized, in the course of which the sample in the matrix is desorbed and ionized. That is, in the MALDI method, the sample indirectly receives the energy which the matrix has received from the laser pulses. Thus the MALDI method is categorized as one of the soft ionizing methods, so that a large molecule can be analyzed without breaking or fragmenting it. Usually, the nitrogen laser of 337 nm wavelength, and matrix substances that absorb such laser are used in the MALDI method.

Both MALDI-TOFMS and FAB-MS are effective in analyzing refractory substances, but MALDI-TOFMS has an advantage over FAB-MS in that it can ionize hydrophilic large molecules. So the MALDI-TOFMS is useful in measuring the molecular mass of proteins and peptides. However, it has a shortcoming that low polarity molecules are hardly ionized, because such molecules have a low hydrophilic affinity with the matrix of MALDI, and thus are difficult to be hydrogenated. On the other hand, in the FAB-MS, glycerin-like viscous matrix is used, and such viscous matrix can trap low polarity molecules, hydrogenate them and easily ionize them.

As described above, both MALDI-TOFMS and FAB-MS have respective advantages and disadvantages. If, then, the MALDI-TOFMS can ionize low polarity molecules having the molecular mass of 3000 or larger, which is out of the analyzable range of FAB-MS, the mass analyses of large molecules will have a wide range of applications.

In the protein-protein complex or protein-nucleic acid complex (which are collectively referred to as "protein complexes" hereinafter), the protein-protein or the protein-nucleic acid is bonded weakly with the noncovalent bond. So the protein complexes break at the bond when they are ionized with the conventional MALDI method using, for example, a nitrogen laser, and it is impossible to ionize the complexes as a whole (Japanese Unexamined Patent Publication No. 2004-037128, [0009]-[0011]).

Further, in the MALDI method, the sample does not need to absorb the laser light directly, which enables ionization of a wide variety of samples. However, it is impossible to selectively ionize a specific component or specific kind of molecules (e.g., a DNA or a peptide) of the sample. When a specific kind (target kind) of molecules is to be ionized, it is necessary to irradiate a laser having the wavelength proper to the target kind and give the energy directly to the molecule, rather than indirectly via the matrix. But, up to now, there has been no such mass spectrometer that can change the wavelength of laser irradiated to the sample depending on the target molecule. Thus it is impossible to separately ionize plural kinds of molecules contained in protein complexes.

SUMMARY OF THE INVENTION

An object of the present invention is therefore to provide a mass spectrometer that can ionize low polarity large molecules of 3000 Da or larger, that can ionize and mass analyze protein complexes without breaking them, and that can mass analyze target molecules separately from other molecules independent of the kind of matrix.

The mass spectrometer according to the present invention includes:

a light source for emitting pulse light including a plurality of wavelengths;

an ionizer for ionizing molecules of a sample by irradiating the light from the light source to the sample; and a mass analyzer for separating ions ionized in the ionizer according to their mass to charge ratios.

The light source of the present invention may include one of the following.

A light source including a plurality of ultrashort pulse laser sources each emitting a wavelength different from others, and A light source emitting ultrashort pulse light including plural wavelengths ranging from the visible region to the infrared region generated by dispersing an ultrashort pulse light with continuous (white) spectrum.

The light with continuous (white) spectrum can be made by, for example, irradiating an ultrashort pulse light onto a target substance such as glass, or by passing an ultrashort pulse light through a photonic crystal fiber.

When the ultrashort pulse laser of plural wavelengths is irradiated onto a sample, it is preferable to separate plural pieces of pulse lasers having different wavelengths with respect to time in order to prevent interference between the laser pieces.

In the ionizer of the present invention, the pulse lights from the light source are irradiated onto a sample, whereby the sample is ionized. In the mass spectrometer of the present invention, a biological sample taken out of a living body can be used as a sample as it is. Protein complexes contained in the sample do not break and are ionized as a whole when laser light having a proper wavelength is irradiated.

In the present invention, lasers of plural wavelengths are irradiated onto a sample for the purpose of:

(a) One among the plural wavelengths is used for the single-photon exciting mode. The wavelength is set to be within an absorption band of the matrix. Since the matrix includes various molecules having one or more absorption bands, it can be vaporized with the pulse laser of this wavelength. At the same time, another pulse laser of ultraviolet/visible region (e.g., $Ar^{+}$ ion laser of 477 nm wavelength) is used.

(b) One among the plural wavelength is set at the single-photon exciting mode, and other wavelengths are set at the 1/n wavelength (where n=2, 3, . . . ) for provoking the two- or multi-photon exciting process generated from a nonlinear object. In the basic single-photon mode, the matrix containing one or more absorption substances is vaporized, and the sample is ionized with the light of wavelengths corresponding to the two- or multi-photon exciting process.

(c) Lasers having wavelengths respectively corresponding to the molecules of object kind are irradiated onto the sample, so that only the molecules of object kind are analyzed. Conventionally, in order to analyze molecules of plural kinds, the matrix had to be changed, or the laser source itself had to be replaced depending on the kind.

In a conventional MALDI method, matrix containing a sample is irradiated by nitrogen gas laser having 337 nm wavelength, in which case protein complexes included in the sample are fragmented. Since a fragmentation of a molecule occurs when a photon having the energy higher than the bonding energy of the molecule is given to the molecule, it is necessary to use light having a wavelength longer than that corresponding to the energy of the noncovalent bond between proteins, or between protein and nucleic acid, of a protein complex.

Roughly speaking, the physical process of an ionization in the MALDI method is composed of: the vaporization of the sample, and the ionization of the molecules of vaporized sample. In the present invention, the light of wavelengths ranging from the visible region (600 nm and longer) to the near-infrared region (up to 1.1 μm) is used as the vaporizer, and plural wavelengths are used in order to vaporize matrix which is a mixture of plural components having different absorbing wavelengths. This enhances the vaporizing efficiency of the matrix. Further, in order to perform the vaporization and the ionization smoothly at the same time, different wavelengths are used to share the role of vaporization: one for the sample and one for the matrix which is used for assisting ionization of the sample and is normally made of a viscous substance. This share of role further optimizes the vaporizing efficiency and the ionizing efficiency.

In the FAB-MS, as described before, a glycerin-like viscous substance is used in the matrix in order to ionize low polarity molecules. In the MALDI, also, low polarity molecules can be ionized by adding such a glycerin-like viscous substance into the matrix. That is, a proper matrix substance is used for the purpose of vaporization, and another proper matrix substance is used for the purpose of ionization. Using the mixture of these substances, they share the role in the mixture, and both purposes can be achieved at the same time. In this case, the wavelength and the intensity of the laser should be carefully chosen so that the fragmentation of the sample does not occur on a large scale. Normally, glycerin-like substances have a high absorbance of ultraviolet, and the nitrogen laser tends to cause fragmentation when the intensity is large.

In the mass spectrometer, the ions thus generated are separated with their mass to charge ratios (m/z). In the present invention, any type of mass spectrometers can be used, such as the TOF type, ion trap type, quadrupole type, etc.

In the mass spectrometer of the present invention, pulse lights having plural wavelengths ranging from near infrared to the ultraviolet region respectively share the role; i.e., one of them vaporizes the sample without fragmenting it, and another ionizes the vaporized sample with the single-photon process or two-photon (or multi-photon) process. This enables ionization of protein complexes as a whole contained in the sample, and enables mass analyses on them.

The mass spectrometer of the present invention also enables analyses of plural kinds of molecules in various manners without largely changing the settings of the mass spectrometer. For example, by providing plural sets of ultrashort pulses of different wavelengths, and use one of them according to the sequence of the analysis, the analyzing process can be formalized, which allows non-experts to use the mass spectrometer and perform analyses easily and quickly.

DETAILED DESCRIPTION OF PREFERRED EMBODIMENTS

Figure 1:
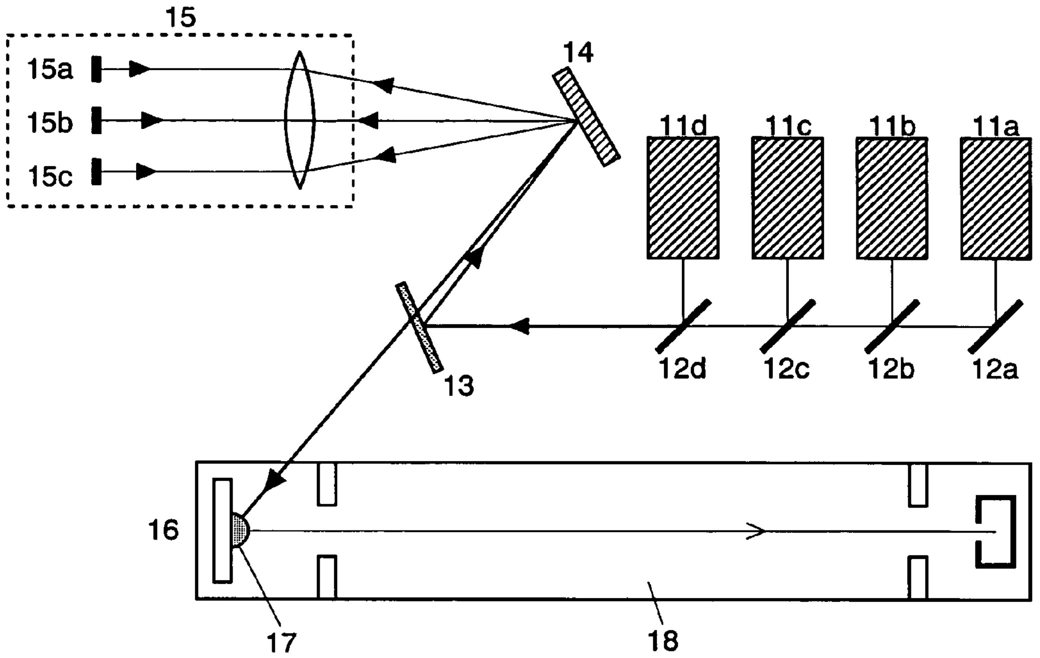
FIG. 1 is a schematic diagram of a mass spectrometer embodying the first aspect of the present invention.

A mass spectrometer embodying the first aspect of the present invention is described referring to FIG. 1. Though the mass spectrometer of FIG. 1 is specifically described as a TOF (Time-of-Flight) type, there is no limitation in embodying the present invention. In the mass spectrometer of the present embodiment, a laser source is composed of four ultrashort pulse laser generators 11*a*-11*d*, where each of the generators 11*a*-11*d* emits ultrashort pulse laser of a narrow wavelength band having different central wavelength from others. The four pulse lasers are reflected by respectively provided mirrors 12*a*-12*d* (in which the first one 12*a* is a full reflection mirror, and the other three 12*b*-12*d* are half mirrors), merged on a path, and reflected by another mirror (half mirror) 13 toward a diffraction grating 14. The diffraction grating 14 disperses the pulse lasers with respect to wavelength, and sends them to a wavelength selector 15. In the wavelength selector 15, plural (three in the case of FIG. 1) mirrors 15*a*-15*c* are provided at predetermined positions of the dispersed wavelengths. Each of the mirrors 15*a*-15*c* has a variable reflectivity, so that pulse laser of desired wavelengths (or a wavelength) can be selected by controlling the reflectivity of respective mirrors 15*a*-15*c*. The pulse laser of selected wavelengths (or wavelength) are sent back to the diffraction grating 14, are (is) reflected by it, pass through the half mirror 13, and are (is) irradiated onto a sample 17 placed in an ionizing part 16.

In the ionizing part 16, among those irradiated onto the sample 17, pulse laser of a longer wavelength vaporizes the matrix and the sample, and that of a shorter wavelength ionizes the sample. When the matrix contains plural components, the matrix and the sample can be effectively vaporized by irradiating pulse lasers having wavelengths corresponding to the absorption wavelengths of the components. The ionized samples (sample ions) are accelerated by a high voltage, and sent to a mass analyzing part 18, where the sample ions are separated with their mass to charge ratios.

Figure 2:
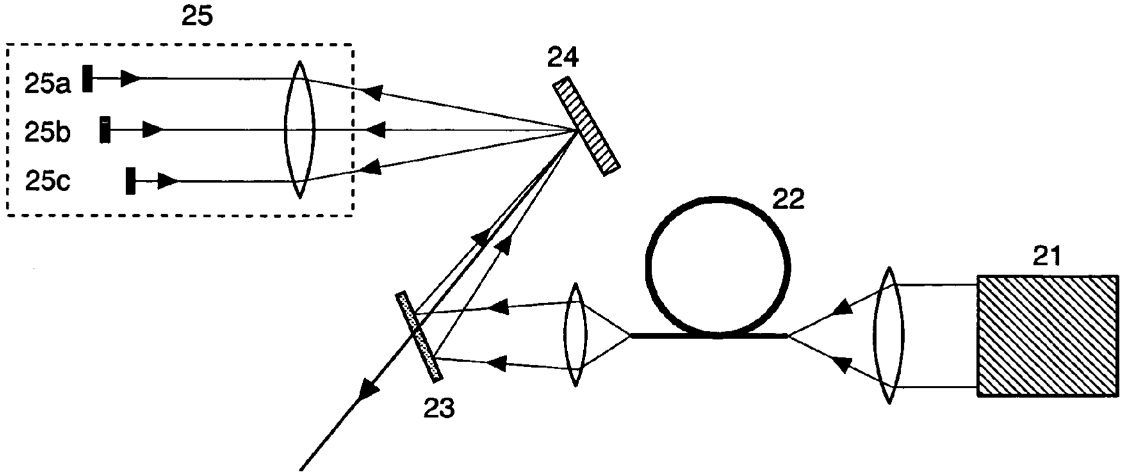
FIG. 2 is a schematic diagram of the light source of another mass spectrometer embodying the second aspect of the present invention.

Another embodiment of the present invention is described referring to FIG. 2, which shows a light source of a mass spectrometer. In the present embodiment, too, the ionizing part and the mass analyzing part can be any type. The light source of the present embodiment is composed of an ultrashort pulse light source 21, a photonic crystal fiber 22, a diffraction grating 24, a wavelength light separator 25, etc. An ultrashort pulse light generated in the ultrashort pulse light source 21 enters into the photonic crystal fiber 22, and is converted to a white ultrashort pulse light while passing through the fiber 22. The white ultrashort pulse light is reflected by a half mirror 23, directed to the diffraction grating 24, where it is dispersed with respect to wavelength, and sent to the wavelength light separator 25. In the wavelength light separator 25, plural (three in the case of FIG. 2) mirrors 25*a*-25*c* are provided at the positions of predetermined wavelengths. The mirrors 25*a*-25*c* are movable in the direction of the light path. Among the component pulse lights dispersed by the diffraction grating 24, those having wavelengths corresponding to the positions of the mirrors 25*a*-25*c* are reflected by them. They then come back to the diffraction grating 24, are reflected by it, pass through the half mirror 23, and are irradiated onto the sample 17 placed in the ionizing part 16 (FIG. 1).

If the pulse lights of different frequencies (or wavelengths) are irradiated onto the sample 17 at the same time, an interference light having the frequency equal to the difference of the frequencies of the pulse lights may be generated due to the nonlinear effect of the interference between different wavelengths. Such an interference light may vaporize non-objective components of the matrix or ionize non-objective components of the sample. Thus it is preferable to shift the positions of the movable mirrors 25*a*-25*c* along the light path, so that the traveling distances of the pulse lights of different wavelengths become different, and the pulse lights are separated with respect to time. This prevents generation of such an interference light, and prevents vaporization and ionization of undesired components.

What is claimed is:

1. A mass spectrometer for analyzing a biological sample, comprising:

a light source for emitting pulse light including a plurality of wavelengths including one for vaporizing the sample without fragmenting molecules of the sample and another for ionizing the vaporized sample;

an ionizer for ionizing molecules of the sample by irradiating the light from the light source to the sample; and a mass analyzer for separating ions ionized in the ionizer according to their mass to charge ratios.

2. The mass spectrometer according to claim 1, wherein the light source includes a plurality of ultrashort pulse laser sources each emitting ultrashort pulse laser of different wavelengths from others.

3. The mass spectrometer according to claim 1, wherein, in the light source, an ultrashort pulse light is irradiated onto a target substance, an ultrashort white pulse light having a continuous spectrum is emitted from the target substance, the ultrashort white pulse light is separated with respect to wavelength, and an ultrashort monochrome pulse light having a predetermined wavelength is emitted from the light source.

4. The mass spectrometer according to claim 1, wherein, in the light source, an ultrashort pulse light is introduced into an end of a photonic crystal fiber, an ultrashort white pulse light having a continuous spectrum is emitted from the other end of the photonic crystal fiber, the ultrashort white pulse light is separated with respect to wavelength, and an ultrashort monochrome pulse light having a predetermined wavelength is emitted from the light source.

5. The mass spectrometer according to claim 2, further comprising a wavelength light separator for separating a plurality of pulse lights with respect to time according to their wavelengths.

6. The mass spectrometer according to claim 4, further comprising a wavelength light separator for separating a plurality of pulse lights with respect to time according to their wavelengths.

7. The mass spectrometer according to claim 1, wherein a plurality of ultrashort pulse lights are separated into a plurality of groups of different wavelengths, and one or plural of the groups of the ultrashort pulse lights are irradiated onto the sample according to a predetermined sequence of an analysis.

* * * * *